United States Patent
Satoh

(10) Patent No.: US 6,657,876 B2
(45) Date of Patent: Dec. 2, 2003

(54) SWITCHED-CAPACITOR-TYPE STABILIZED POWER SUPPLY DEVICE

(75) Inventor: Tsutomu Satoh, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/178,840

(22) Filed: Jun. 25, 2002

(65) Prior Publication Data

US 2003/0007373 A1 Jan. 9, 2003

(30) Foreign Application Priority Data

Jul. 9, 2001 (JP) ........................................ 2001-207284

(51) Int. Cl.[7] ................................................. H02M 3/18
(52) U.S. Cl. .......................................... 363/60; 307/110
(58) Field of Search ...................... 363/59, 60; 307/109, 307/110; 327/536

(56) References Cited

U.S. PATENT DOCUMENTS 5,768,116 A * 6/1998 Kompelien .................. 363/59
6,483,728 B1 * 11/2002 Johnson et al. ............. 363/60

FOREIGN PATENT DOCUMENTS

JP 2000-184697 6/2000

* cited by examiner

Primary Examiner—Shawn Riley
(74) Attorney, Agent, or Firm—Harness, Dickey & Pierce, P.L.C.

(57) ABSTRACT

To permit a switched-capacitor-type stabilized power supply device to operate stably until the battery power falls considerably low, it needs to be provided with a voltage step-up circuit with a high voltage step-up factor. However, inconveniently, in a conventional switched-capacitor-type stabilized power supply device, increasing the voltage step-up factor of the voltage step-up circuit increases the difference between the voltage stepped-up by the voltage step-up circuit when the battery voltage is still high and the set output voltage, and thus lowers power conversion efficiency. By contrast, a switched-capacitor-type stabilized power supply device of the invention has a plurality of voltage step-up circuits each having a different voltage step-up factor, a switching circuit for connecting and disconnecting an input terminal, to which a direct-current voltage is applied, to and from the voltage step-up circuits, and a switching control circuit for controlling the switching circuit according to the input level to and/or the output level from the switched-capacitor-type stabilized power supply device.

18 Claims, 5 Drawing Sheets

SWITCHED-CAPACITOR-TYPE STABILIZED POWER SUPPLY DEVICE

BACKGROUND OF THE INVENTION

1. Field of the Invention

The present invention relates to a switched-capacitor-type stabilized power supply device.

2. Description of the Prior Art

A conventional switched-capacitor-type stabilized power supply device will be described with reference to FIG. 7. An input terminal IN is connected to the positive side of a capacitor C2 and to the input side of a voltage step-up circuit 12. The negative side of the capacitor C2 is grounded.

The voltage step-up circuit 12 is provided with a capacitor C1 and switching devices SW11 to SW14. The node between one end of the switching device SW12 and one end of the switching device SW13 is connected to the input side of the voltage step-up circuit 12. The other end of the switching device SW12 is connected to one end of the switching device SW11, and the other end of the switching device SW11 is connected to the output side of the voltage step-up circuit 12. The other end of the switching device SW13 is connected to one end of the switching device SW14, and the other end of the switching device SW14 is grounded. One end of the capacitor C1 is connected to the node between the switching devices SW11 and SW12, and the other end of the capacitor C1 is connected to the node between the switching devices SW13 and SW14.

The output side of the voltage step-up circuit 12 is connected to one end of a resistor R1, to one end of a capacitor C3, and to an output terminal OUT. The other end of the capacitor C3 is grounded. The other end of the resistor R1 is grounded through a resistor R2.

The node between the resistors R1 and R2 is connected to the non-inverting input terminal of a comparator 3. Connected to the inverting input terminal of the comparator 3 is the positive side of a constant voltage source 4 that output a reference voltage $V_{ref1}$. The negative side of the constant voltage source 4 is grounded. The output terminal of the comparator 3 is connected to a control circuit 5, which is connected to the control terminals of the switching devices SW11 to SW14. The comparator 3 is of the type that exhibits hysteresis.

Now, the operation of the conventional switched-capacitor-type stabilized power supply device configured as described above will be described. A direct-current power source (not shown) is connected to the input terminal IN so that an input voltage $V_{in}$ is applied to the input terminal IN. The control circuit 5 turns on and off the switching devices SW11 to SW14 according to the level of the output signal S1 of the comparator 3, which will be described later. The control circuit 5 incorporates an oscillator, and evaluates the level of the output signal S1 of the comparator 3 every period T.

When the output signal S1 of the comparator 3 is at a low level, the control circuit 5 performs alternately, by switching every period T, charge control operation in which it keeps the switching devices SW12 and SW14 on and the switching devices SW11 and SW13 off and discharge control operation in which it keeps the switching devices SW12 and SW14 off and the switching devices SW11 and SW13 on.

On the other hand, when the output signal S1 of the comparator 3 is at a high level, the control circuit 5, rather than switching between the two types of control operation every period T, performs only charge control operation in which it keeps the switching devices SW12 and SW14 on and the switching devices SW11 and SW13 off.

As a result of the control circuit 5 performing charge control operation, the capacitor C1 of the voltage step-up circuit 12 is charged, and its charge voltage reaches $V_{in}$. During this charge period, an output current flows from the output terminal OUT to a load (not shown) connected to the output terminal OUT, and therefore the capacitor C3 discharges, and the output voltage $V_o$ lowers.

On the other hand, as a result of the control circuit 5 performing discharge control operation, the negative side of the capacitor C1 is connected to the input terminal IN, and thus the potential at the negative side of the capacitor C1, which was equal to zero when the control circuit 5 was performing charge control operation, becomes equal to $V_{in}$. Accordingly, the potential at the positive side of the capacitor C1, which was equal to $V_{in}$ when the control circuit 5 was performing charge control operation, becomes equal to $2 \times V_{in}$. In this way, during the discharge period, a voltage stepped up by a factor of 2 is fed to the capacitor C3, and thus the output voltage $V_o$ increases.

The resistors R1 and R2 serve as a voltage detecting means for detecting the output voltage $V_o$, outputting a division voltage $V_a$ of the output voltage $V_o$ to the comparator 3. The comparator 3 compares the division voltage $V_a$ of the output voltage $V_o$ with the reference voltage $V_{ref1}$ and, when the division voltage $V_a$ of the output voltage $V_o$ is higher than or equal to the reference voltage $V_{ref1}$, turns the output signal S1 to a high level.

Since the comparator 3 is of the type that exhibits hysteresis, once it turns the output signal S1 to a high level, it keeps the output signal S1 at a high level even when the division voltage $V_a$ of the output voltage $V_o$ becomes lower than the reference voltage $V_{ref1}$. When the output voltage $V_o$ becomes so low that the division voltage $V_a$ of the output voltage $V_o$ is lower than $V_{ref1'}$ ($<V_{ref1}$), the comparator 3 turns the output signal S1 from a high level to a low level.

As a result of the operation described above, the division voltage $V_a$ of the output voltage $V_o$ is kept in the range from $V_{ref1'}$ to $V_{ref1}$ and the output voltage $V_o$ is thereby stabilized within a predetermined range, so that the output voltage $V_o$ is kept substantially equal to the set output voltage $V_o^*$.

In the conventional switched-capacitor-type stabilized power supply device shown in FIG. 7, the voltage step-up circuit 12 employs a 2× voltage step-up circuit that steps up the input voltage by a factor of 2. It is possible, however, to realize voltage step-up circuits of various voltage step-up factors, such as 1.5× and 3×, by varying the combination of switching devices and capacitors used in them.

A battery is generally used as a direct-current power source for supplying electric power to a switched-capacitor-type stabilized power supply device. To extend the life of the battery, it is essential that the switched-capacitor-type stabilized power supply device operate stably until the battery voltage falls considerably low, and that it operate with as high power conversion efficiency as possible. In recent years, in particular, switched-capacitor-type stabilized power supply devices have been increasingly used as power sources for driving blue or white LEDs used as backlights for liquid crystal displays incorporated in cellular phones. This trend has been increasing the demand for switched-capacitor-type stabilized power supply devices that permit extended battery lives.

To permit a switched-capacitor-type stabilized power supply device to operate stably until the battery power falls considerably low, it needs to be provided with a voltage step-up circuit with a high voltage step-up factor.

However, inconveniently, increasing the voltage step-up factor of the voltage step-up circuit increases the difference between the voltage stepped-up by the voltage step-up circuit when the battery voltage is still high and the set output voltage Vo*, and thus lowers power conversion efficiency. For example, in the case of the conventional switched-capacitor-type stabilized power supply device having a 2× voltage step-up circuit shown in FIG. 7, its power conversion efficiency η[%] is approximated as $(100 \times V_o)/(2 \times V_{in})$, and thus, when, for example, $V_o = V_{in}$, the power conversion efficiency η is 50%. Moreover, where the voltage step-up circuit has a fixed voltage step-up factor n, as in the conventional switched-capacitor-type stabilized power supply device, the switched-capacitor-type stabilized power supply device needs to withstand $V_{in} \times n$. Thus, inconveniently, increasing the voltage step-up factor n of the voltage step-up circuit requires designing the switched-capacitor-type stabilized power supply device to withstand an accordingly high voltage.

SUMMARY OF THE INVENTION

An object of the present invention is to provide a switched-capacitor-type stabilized power supply device that offers high power conversion efficiency even when the input level to it and/or the output level from it varies greatly.

To achieve the above object, according to the present invention, a switched-capacitor-type stabilized power supply device is provided with: an input terminal to which a direct-current voltage is applied; a plurality of voltage step-up circuits each having a different voltage step-up factor; an output-side capacitor that is charged with the output voltage from the voltage step-up circuits; a voltage detecting circuit for detecting the voltage across the output-side capacitor; a control circuit for turning switching devices on and off according to the voltage detected by the voltage detecting circuit; a switching circuit for connecting and disconnecting the input terminal to and from the voltage step-up circuits; and a switching control circuit for controlling the switching circuit according to the input level to and/or the output level from the switched-capacitor-type stabilized power supply device. Here, the voltage step-up circuits each have a capacitor and a switching device, which is turned on and off by the control circuit, and operate by charging and discharging the capacitor through the switching operation of the switching device so as to step-up the direct-current voltage and output a stepped-up voltage while the capacitor is discharging.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
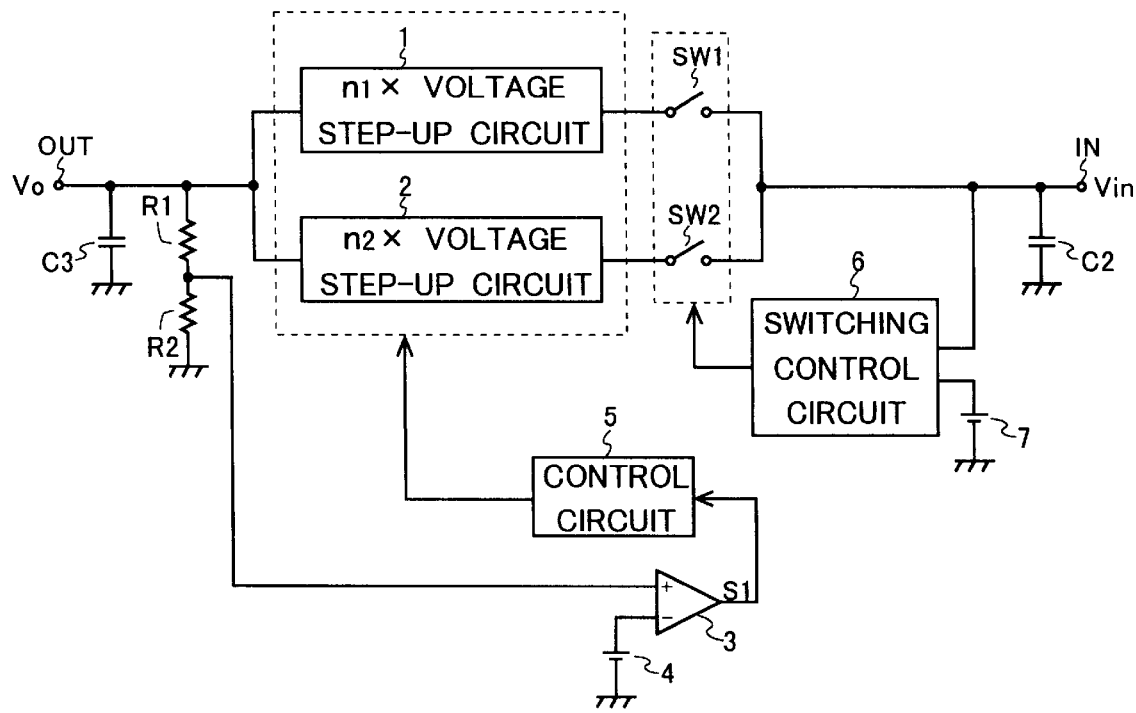
FIG. 1 is a diagram showing the configuration of the switched-capacitor-type stabilized power supply device of a first embodiment of the invention.
Figure 7:
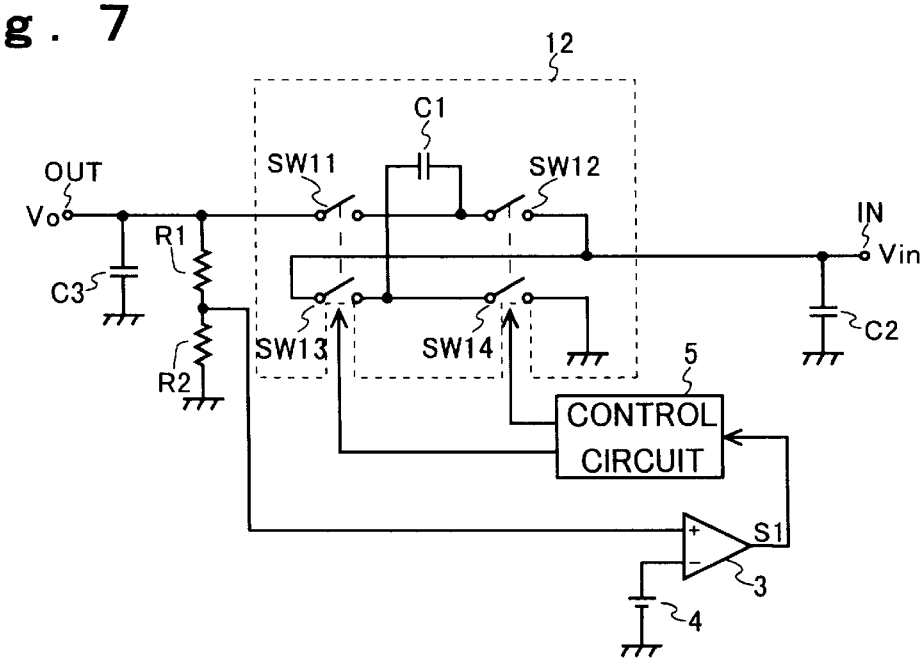
FIG. 7 is a diagram showing the configuration of a conventional switched-capacitor-type stabilized power supply device.

FIG. 1 shows the configuration of the switched-capacitor-type stabilized power supply device of a first embodiment of the invention. It is to be noted that such circuit elements and signals as are found also in the conventional switched-capacitor-type stabilized power supply device shown in FIG. 7 are identified with the same reference numerals, and their explanations will be omitted.

An input terminal IN is connected to the positive side of a capacitor C2, to a switching control circuit 6, to one end of a switching device SW1, and to one end of a switching device SW2. The negative side of the capacitor C2 is grounded. Also connected to the switching control circuit 6 is the positive side of a constant voltage source 7 that outputs a reference voltage $V_{ref2}$. The negative side of the constant voltage source 7 is grounded. Moreover, the switching control circuit 6 is connected to the control electrodes of the switching devices SW1 and SW2.

The other end of the switching device SW1 is connected to the input side of an $n_1 \times$ voltage step-up circuit 1, and the other end of the switching device SW2 is connected to the input side of an $n_2 \times$ voltage step-up circuit 2. The output sides of the $n_1 \times$ and $n_2 \times$ voltage step-up circuits 1 and 2 are connected together, with the node between them connected to one end of a resistor R1, to one end of a capacitor C3, and to an output terminal OUT. The other end of the capacitor C3 is grounded. The other end of the resistor R1 is grounded through a resistor R2. Here, the $n_1 \times$ voltage step-up circuit 1 has a lower voltage step-up factor than the $n_2 \times$ voltage step-up circuit 2. That is, $n_1 < n_2$.

The node between the resistors R1 and R2 is connected to the non-inverting input terminal of a comparator 3. Connected to the inverting input terminal of the comparator 3 is the positive side of a constant voltage source 4 that outputs a reference voltage $V_{ref1}$. The negative side of the constant voltage source 4 is grounded. The output terminal of the comparator 3 is connected to a control circuit 5, which is connected to a switching device (not shown) included in the $n_1 \times$ voltage step-up circuit 1 and to a switching device (not shown) included in the $n_2 \times$ voltage step-up circuit 2.

The switched-capacitor-type stabilized power supply device configured as described above operates in the following manner. The switching control circuit 6 compares an input voltage $V_{in}$ with the reference voltage $V_{ref2}$ output from the constant voltage source 7, and, if the input voltage $V_{in}$ is equal to or higher than the reference voltage $V_{ref2}$, it turns the switching device SW1 on and the switching device SW2 off so as to select the $n_1 \times$ voltage step-up circuit 1. By contrast, if the $V_{in}$ is lower than the reference voltage $V_{ref2}$, the switching control circuit 6 turns the switching device SW1 off and the switching device SW2 on so as to select the $n_2 \times$ voltage step-up circuit 2.

It is advisable to set the reference voltage $V_{ref2}$ equal to the minimum level of the input voltage $V_{in}$ that the $n_1 \times$ voltage step-up circuit 1 can step up to the set output voltage Vo*.

In this way, when the input voltage $V_{in}$ is high, the $n_1\times$ voltage step-up circuit 1, which has the lower voltage step-up factor, is selected in order to reduce the difference between the voltage stepped-up by the voltage step-up circuit and the set output voltage Vo* and thereby increase power conversion efficiency; when the input voltage $V_{in}$ is low, the $n_2\times$ voltage step-up circuit 2, which has the higher voltage step-up factor, is selected so that the input voltage $V_{in}$ can be stepped up to the set output voltage Vo*. This makes it possible to realize a switched-capacitor-type stabilized power supply device that operates stably with a low input voltage and that offers high power conversion efficiency even when the input voltage varies greatly. Thus, where a battery is used as the direct-current power source connected to the input terminal IN, it is possible to extend the life of the battery.

Figure 2:
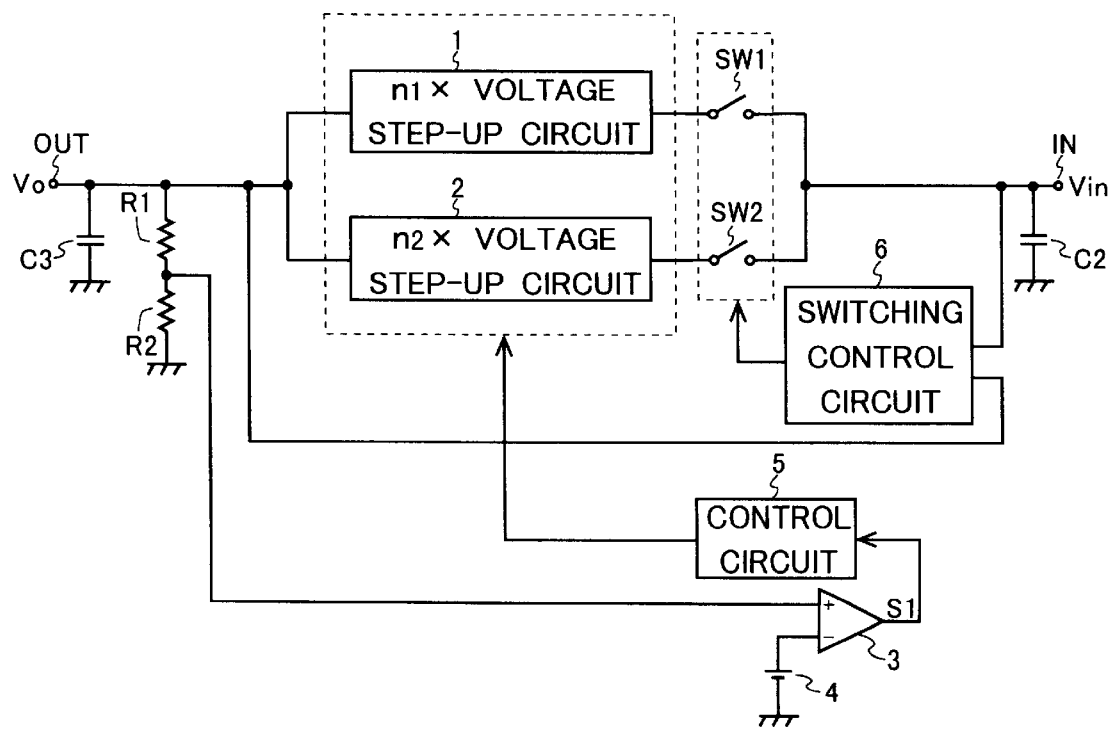
FIG. 2 is a diagram showing the configuration of the switched-capacitor-type stabilized power supply device of a second embodiment of the invention.

FIG. 2 shows the configuration of the switched-capacitor-type stabilized power supply device of a second embodiment of the invention. It is to be noted that such circuit elements and signals as are found also in the switched-capacitor-type stabilized power supply device of the first embodiment shown in FIG. 1 are identified with the same reference numerals, and their explanations will be omitted.

The switched-capacitor-type stabilized power supply device of the second embodiment shown in FIG. 2 differs from the switched-capacitor-type stabilized power supply device of the first embodiment shown in FIG. 1 in that the constant voltage source 7 is not provided and that the output terminal OUT is connected to the switching control circuit 6.

The level of the set output voltage Vo* can be varied by varying the resistances of the resistors R1 and R2 and the level of the reference voltage $V_{ref1}$ output from the constant voltage source 4. When the level of the set output voltage Vo* is varied, the minimum level of the input voltage $V_{in}$ that the $n_1\times$ voltage step-up circuit 1 can step up to the set output voltage Vo* varies accordingly.

Therefore, in the switched-capacitor-type stabilized power supply device of the second embodiment, the switching control circuit 6 receives the input voltage $V_{in}$ and the output voltage $V_o$, and calculates the value $(V_o/V_{in})$ by dividing the output voltage $V_o$ by the input voltage $V_{in}$. When $V_o/V_{in}$ is smaller than the voltage step-up factor n, of the $n_1\times$ voltage step-up circuit 1, the switching control circuit 6 turns the switching device SW1 on and the switching device SW2 off so as to select the $n_1\times$ voltage step-up circuit 1; when $V_o/V_{in}$ is equal to or greater than the voltage step-up factor $n_1$ of the $n_1\times$ voltage step-up circuit 1, the switching control circuit 6 turns the switching device SW1 off and the switching device SW2 on so as to select the $n_2\times$ voltage step-up circuit 2.

In this way, even in a configuration that permits the set output voltage Vo* to be varied, when the input voltage $V_{in}$ is high, the $n_1\times$ voltage step-up circuit 1, which has the lower voltage step-up factor, is selected in order to reduce the difference between the voltage stepped-up by the voltage step-up circuit and the set output voltage Vo* and thereby increase power conversion efficiency; when the input voltage $V_{in}$ is low, the $n_2\times$ voltage step-up circuit 2, which has the higher voltage step-up factor, is selected so that the input voltage $V_{in}$ can be stepped up to the set output voltage Vo*. This makes it possible to realize a switched-capacitor-type stabilized power supply device that permits the set output voltage Vo* to be varied but nevertheless operates stably with a low input voltage and offers high power conversion efficiency even when the input voltage varies greatly. Thus, where a battery is used as the direct-current power source connected to the input terminal IN, it is possible to extend the life of the battery.

Figure 3:
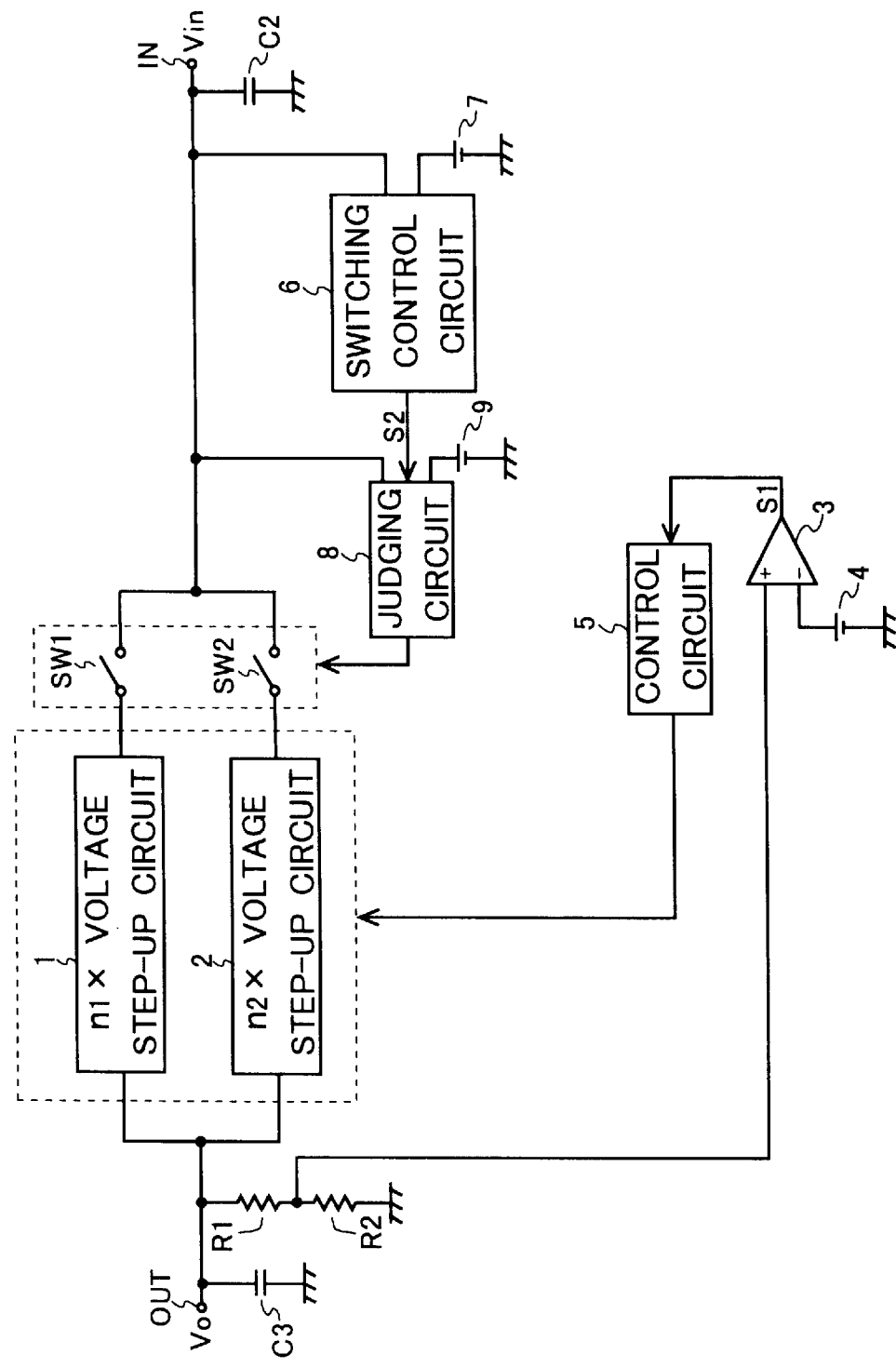
FIG. 3 is a diagram showing the configuration of the switched-capacitor-type stabilized power supply device of a third embodiment of the invention.

FIG. 3 shows the configuration of the switched-capacitor-type stabilized power supply device of a third embodiment of the invention. It is to be noted that such circuit elements and signals as are found also in the switched-capacitor-type stabilized power supply device of the first embodiment shown in FIG. 1 are identified with the same reference numerals, and their explanations will be omitted.

The switched-capacitor-type stabilized power supply device of the third embodiment shown in FIG. 3 differs from the switched-capacitor-type stabilized power supply device of the first embodiment shown in FIG. 1 in that the switching control circuit 6 is connected to the control terminals of the switching devices SW1 and SW2 not directly but through a judging circuit 8 that is connected to the positive side of a constant voltage source 9 that outputs a reference voltage $V_{ref3}$. The negative side of the constant voltage source 9 is grounded. The reference voltage $V_{ref3}$ is equal to the voltage that the switched-capacitor-type stabilized power supply device is designed to withstand.

The switched-capacitor-type stabilized power supply device configured as described above operates in the following manner. The switching control circuit 6 feeds a signal S2 to the judging circuit 8. When the input voltage $V_{in}$ is equal to or higher than the reference voltage $V_{ref2}$, the switching control circuit 6 outputs, as the signal S2, a signal that requests the switching device SW1 to be turned on and the switching device SW2 to be turned off By contrast, when the input voltage $V_{in}$ is lower than the reference voltage $V_{ref2}$, the switching control circuit 6 outputs, as the signal S2, a signal that requests the switching device SW1 to be turned off and the switching device SW2 to be turned on.

Figure 6:
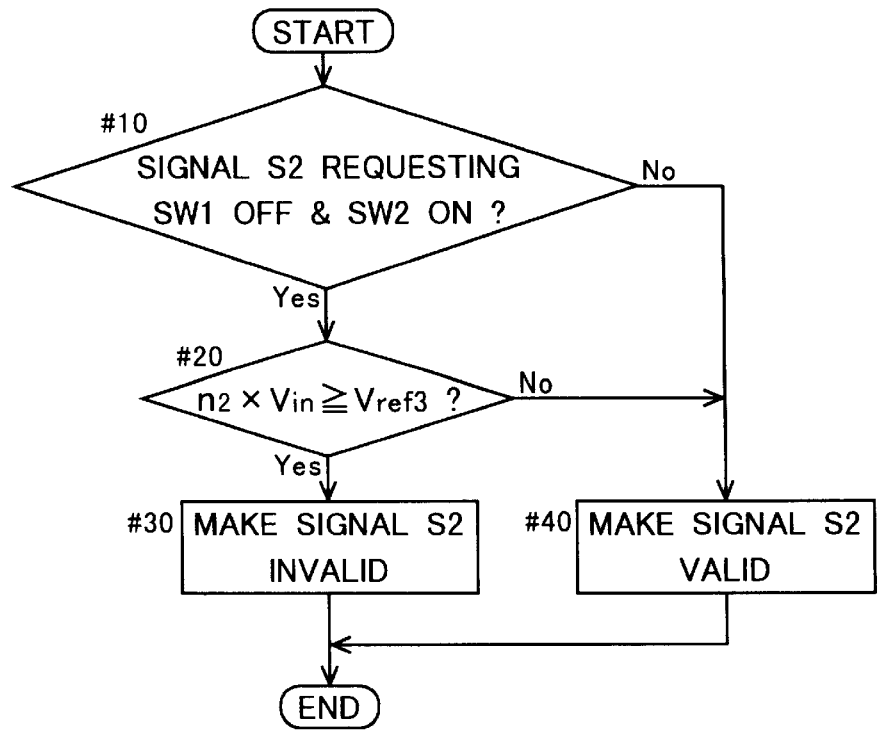
FIG. 6 is a flow chart showing the operation performed by the judging circuit included in the switched-capacitor-type stabilized power supply device of FIG. 3.

In the judging circuit 8, the voltage step-up factor $n_2$ of the $n_2\times$ voltage step-up circuit 2 is stored beforehand. The judging circuit 8 judges whether to make the output signal S2 of the switching control circuit 6 valid or not. Now, how this judgment is made will be described with reference to a flow chart in FIG. 6.

First, the judging circuit 8 checks whether or not the signal S2 is a signal requesting the switching device SW1 to be turned off and the switching device SW2 to be turned on (step #10).

If the signal S2 is not a signal requesting the switching device SW1 to be turned off and the switching device SW2 to be turned on ("No" in step #10), the $n_2\times$ voltage step-up circuit 2 is not selected, and therefore there is no risk of a voltage being generated that is higher than the voltage that the switched-capacitor-type stabilized power supply device can withstand. Thus, the flow proceeds to step #40, where the signal S2 is made valid and is fed, as it is, to the switching devices SW1 and SW2. The flow then comes to an end.

On the other hand, if the signal S2 is a signal requesting the switching device SW1 to be turned off and the switching device SW2 to be turned on ("Yes" in step #10), when the signal S2 is made valid, the $n_2\times$ voltage step-up circuit 2 will be selected. Therefore, it is checked whether or not, when the signal S2 is made valid, there is a risk of a voltage being generated that is higher than the voltage that the switched-capacitor-type stabilized power supply device can withstand (step #20).

In step #20, whether the value calculated by multiplying the voltage step-up factor $n_2$ by the input voltage $V_{in}$ is equal to or higher than the reference voltage $V_{ref3}$ or not is checked. If the value calculated by multiplying the voltage step-up factor $n_2$ by the input voltage $V_{in}$ is lower than the reference voltage $V_{ref3}$ ("No" in step #20), even when the $n_2\times$ voltage step-up circuit 2, which has the higher voltage step-up factor, is selected, there is no risk of a voltage being generated that is higher than the voltage that the switched-capacitor-type stabilized power supply device can withstand. Thus, the flow proceeds to step #40, where the signal S2 is made valid and is fed, as it is, to the switching devices SW1 and SW2. The flow then comes to an end.

On the other hand, if the value calculated by multiplying the voltage step-up factor $n_2$ by the input voltage $V_{in}$ is equal to or higher than the reference voltage $V_{ref3}$ ("Yes" in step #20), when the $n_2\times$ voltage step-up circuit 2, which has the higher voltage step-up factor, is selected, a voltage will be generated that is higher than the voltage that the switched-capacitor-type stabilized power supply device can withstand. Thus, the flow proceeds to step #30, where the signal S2 is made invalid and a signal requesting the switching device SW1 to be turned on and the switching device SW2 to be turned off is fed to the switching devices SW1 and SW2. The flow then comes to an end.

Operating in this way, the judging circuit 8 makes it possible to limit the maximum level of the voltage generated in the switched-capacitor-type stabilized power supply device and thereby prevent destruction of its constituent circuit elements resulting from generation of a voltage higher than the voltage that the switched-capacitor-type stabilized power supply device can withstand.

Figure 4:
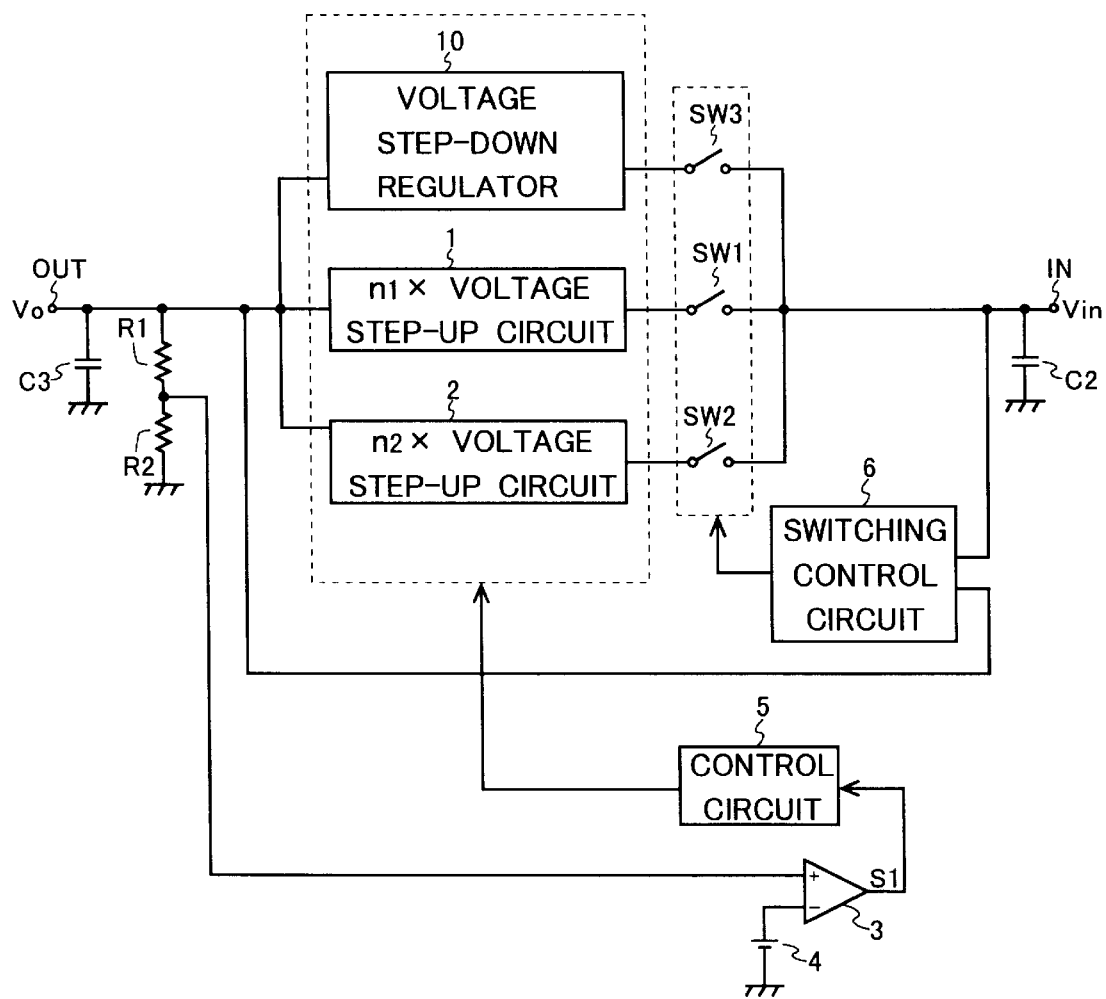
FIG. 4 is a diagram showing the configuration of the switched-capacitor-type stabilized power supply device of a fourth embodiment of the invention.

FIG. 4 shows the configuration of the switched-capacitor-type stabilized power supply device of a fourth embodiment of the invention. It is to be noted that such circuit elements and signals as are found also in the switched-capacitor-type stabilized power supply device of the second embodiment shown in FIG. 2 are identified with the same reference numerals, and their explanations will be omitted.

The switched-capacitor-type stabilized power supply device of the fourth embodiment shown in FIG. 4 differs from the switched-capacitor-type stabilized power supply device of the second embodiment shown in FIG. 2 in that a switching device SW3 and a voltage step-down regulator 10 are additionally provided, with one end of the switching device SW3 connected to the node between the switching devices SW1 and SW2, the other end of the switching device SW3 connected to the input side of the voltage step-down regulator 10, and the output side of the voltage step-down regulator 10 connected to the output terminal OUT.

In the switched-capacitor-type stabilized power supply device of the fourth embodiment, the switching control circuit 6 receives the input voltage $V_{in}$ and the output voltage $V_o$, and calculates the value $(V_o/V_{in})$ by dividing the output voltage $V_o$ by the input voltage $V_{in}$. When $V_o/V_{in}$ is smaller than 1, the switching control circuit 6 turns the switching device SW1 off, the switching device SW2 off, and the switching device SW3 on so as to select the voltage step-down regulator 10. When $V_o/V_{in}$ is equal to or greater than 1 and smaller than the voltage step-up factor of the $n_1\times$ voltage step-up circuit 1, the switching control circuit 6 turns the switching device SW1 on, the switching device SW2 off, and the switching device SW3 off so as to select the $n_1\times$ voltage step-up circuit 1. When $V_o/V_{in}$ is equal to or greater than the voltage step-up factor of the $n_1\times$ voltage step-up circuit 1, the switching control circuit 6 turns the switching device SW1 off, the switching device SW2 on, and the switching device SW3 off so as to select the $n_2\times$ voltage step-up circuit 2.

In this way, even when the input voltage $V_{in}$ is higher than the set output voltage Vo*, the switched-capacitor-type stabilized power supply device can output the set output voltage Vo*. In addition, when the input voltage $V_{in}$ is high, the $n_1\times$ voltage step-up circuit 1, which has the lower voltage step-up factor, is selected in order to reduce the difference between the voltage stepped-up from the input voltage $V_{in}$ and the set output voltage Vo* and thereby increase power conversion efficiency; when the input voltage $V_{in}$ is low, the $n_2\times$ voltage step-up circuit 2, which has the higher voltage step-up factor, is selected so that the input voltage $V_{in}$ can be stepped up to the set output voltage Vo*.

Figure 5:
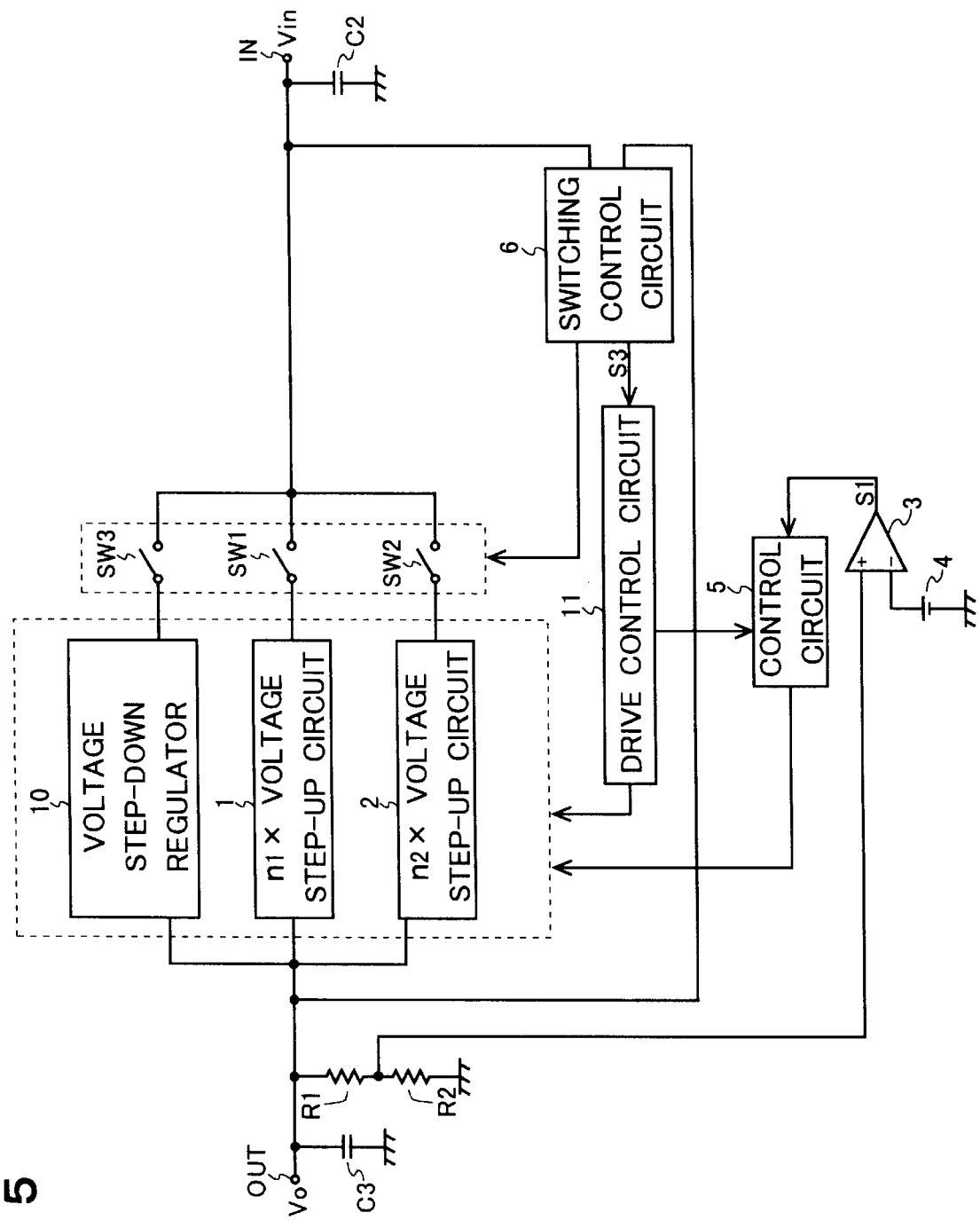
FIG. 5 is a diagram showing the configuration of the switched-capacitor-type stabilized power supply device of a fifth embodiment of the invention.

FIG. 5 shows the configuration of the switched-capacitor-type stabilized power supply device of a fifth embodiment of the invention. It is to be noted that such circuit elements and signals as are found also in the switched-capacitor-type stabilized power supply device of the fourth embodiment shown in FIG. 4 are identified with the same reference numerals, and their explanations will be omitted.

The switched-capacitor-type stabilized power supply device of the fifth embodiment shown in FIG. 5 differs from the switched-capacitor-type stabilized power supply device of the fourth embodiment shown in FIG. 4 in that a drive control circuit 11 is additionally provided that is connected to the control circuit 5, to the switching control circuit 6, to the voltage step-down regulator 10, to the $n_1\times$ voltage step-up circuit 1, and to the $n_2\times$ voltage step-up circuit 2.

The $n_1\times$ and $n_2\times$ voltage step-up circuits 1 and 2 are each provided with, in addition to a capacitor and a switching device, a circuit that is fed with a constant voltage. The voltage step-down regulator 10, too, is provided with a circuit that is fed with a constant voltage. In the switched-capacitor-type stabilized power supply device of this embodiment, the $n_1\times$ and $n_2\times$ voltage step-up circuits 1 and 2 and the voltage step-down regulator 10 are each provided with a switching device that connects and disconnects a constant voltage source to and from their respective circuit fed with the constant voltage, and the drive control circuit 11 feeds a control signal to the control terminals of those switching devices.

The drive control circuit 11 receives from the switching control circuit 6 a signal S3 that indicates which of the $n_1\times$ and $n_2\times$ voltage step-up circuits 1 and 2 and the voltage step-down regulator 10 has been selected. According to the signal S3, the drive control circuit 11 turns off the switching devices that connect and disconnect the constant voltage sources to and from the circuits fed with the constant voltages in two of the $n_1\times$ and $n_2\times$ voltage step-up circuits 1 and 2 and the voltage step-down regulator 10 which are not being selected.

The control circuit 5 is composed of a portion that is needed exclusively to control the operation of the voltage step-down regulator 10, a portion that is needed exclusively to control the operation of the $n_1\times$ voltage step-up circuit 1, a portion that is needed exclusively to control the operation of the $n_2\times$ voltage step-up circuit 2, and a portion needed to control the operation of more than one of those circuits. According to the signal S3, the drive control circuit 11 stops the supply of electric power to part of the control circuit 5. Specifically, according to the signal S3, the drive control circuit 11 stops the supply of electric power to those portions of the control circuit 5 which are needed exclusively to control the operation of two of the $n_1\times$ and $n_2\times$ voltage step-up circuits 1 and 2 and the voltage step-down regulator 10 which are not being selected.

This helps reduce the unwanted consumption of electric power (stand-by electric power consumption) by those of the $n_1\times$ and $n_2\times$ voltage step-up circuits 1 and 2 and the voltage step-down regulator 10 which are not being selected and by the portions needed exclusively to control the operation of those circuits. This makes it possible to achieve even higher power conversion efficiency.

Although the first to fifth embodiments described above all deal with cases in which two voltage step-up circuits are provided, three or more voltage step-up circuits may be provided. The switching control circuit may be so configured as to detect only the output voltage as long as the input voltage is constant, or may be so configured as to detect the output current and control the switching according to the lowering of power conversion efficiency or the like that results when the output current is large.

Moreover, for miniaturization and cost reduction, circuit integration is recommended. For example, in the switched-capacitor-type stabilized power supply device of the first embodiment shown in FIG. 1, it is advisable to form on a single-chip semiconductor integrated circuit device all the circuit elements other than the input terminal IN, the capacitor C2, the resistors R1 and R2, the capacitor C2, the output terminal OUT, and the capacitors (not shown) included in the the $n_1\times$ and $n_2\times$ voltage step-up circuits 1 and 2.

What is claimed is:

1. A switched-capacitor-type stabilized power supply device comprising:
   an input terminal to which a direct-current voltage is applied;
   a plurality of voltage step-up circuits each having a different voltage step-up factor;
   an output-side capacitor that is charged with an output voltage from the voltage step-up circuits;
   a voltage detecting circuit for detecting a voltage across the output-side capacitor;
   a control circuit for turning switching devices on and off according to the voltage detected by the voltage detecting circuit;
   a switching circuit for connecting and disconnecting the input terminal to and from the voltage step-up circuits; and
   a switching control circuit for controlling the switching circuit according to an input level to and/or an output level from the switched-capacitor-type stabilized power supply device,
   wherein the voltage step-up circuits each have a capacitor and a switching device, which is turned on and off by the control circuit, and operate by charging and discharging the capacitor through switching operation of the switching device so as to step-up the direct-current voltage and output a stepped-up voltage while the capacitor is discharging.

2. A switched-capacitor-type stabilized power supply device as claimed in claim 1,
   wherein the switching control circuit controls the switching circuit according to a level of the direct-current voltage.

3. A switched-capacitor-type stabilized power supply device as claimed in claim 2,
   wherein the switching control circuit controls the switching circuit according to the level of the direct-current voltage and a level of the voltage across the output-side capacitor.

4. A switched-capacitor-type stabilized power supply device as claimed in claim 1,
   wherein the switching control circuit controls the switching circuit so that the input terminal is not connected to any of the voltage step-up circuits of which the voltage step-up factor is equal to or higher than a predetermined value divided by the direct-current voltage.

5. A switched-capacitor-type stabilized power supply device as claimed in claim 1, further comprising:
   a circuit for turning off those of the voltage step-up circuits which are not connected to the input terminal by the switching circuit.

6. A switched-capacitor-type stabilized power supply device as claimed in claim 1, further comprising:
   a circuit for turning off portions of the control circuit that control those of the voltage step-up circuits which are not connected to the input terminal by the switching circuit.

7. A switched-capacitor-type stabilized power supply device as claimed in claim 2, further comprising:
   a circuit for turning off those of the voltage step-up circuits which are not connected to the input terminal by the switching circuit; and
   a circuit for turning off portions of the control circuit that control those of the voltage step-up circuits which are not connected to the input terminal by the switching circuit.

8. A switched-capacitor-type stabilized power supply device as claimed in claim 3, further comprising:
   a circuit for turning off those of the voltage step-up circuits which are not connected to the input terminal by the switching circuit; and
   a circuit for turning off portions of the control circuit that control those of the voltage step-up circuits which are not connected to the input terminal by the switching circuit.

9. A switched-capacitor-type stabilized power supply device as claimed in claim 4, further comprising:
   a circuit for turning off those of the voltage step-up circuits which are not connected to the input terminal by the switching circuit; and
   a circuit for turning off portions of the control circuit that control those of the voltage step-up circuits which are not connected to the input terminal by the switching circuit.

10. A switched-capacitor-type stabilized power supply device comprising:
    an input terminal to which a direct-current voltage is applied;
    a plurality of voltage step-up circuits each having a different voltage step-up factor;
    a voltage step-down circuit for stepping-down the direct-current voltage and outputting a stepped-down voltage;
    an output-side capacitor that is charged with an output voltage from the voltage step-up circuits and the voltage step-down circuit;
    a voltage detecting circuit for detecting a voltage across the output-side capacitor;
    a control circuit for controlling operation of the voltage step-up circuits and the voltage step-down circuit according to the voltage detected by the voltage detecting circuit;
    a switching circuit for connecting and disconnecting the input terminal to and from the voltage step-up circuits and the voltage step-down circuit; and
    a switching control circuit for controlling the switching circuit according to an input level to and/or an output level from the switched-capacitor-type stabilized power supply device, wherein the voltage step-up circuits each have a capacitor and a switching device, and operate by charging and discharging the capacitor through switching operation of the switching device so as to step-up the direct-current voltage and output a stepped-up voltage while the capacitor is discharging.

11. A switched-capacitor-type stabilized power supply device as claimed in claim 10, wherein the switching control circuit controls the switching circuit according to a level of the direct-current voltage.

12. A switched-capacitor-type stabilized power supply device as claimed in claim 11, wherein the switching control circuit controls the switching circuit according to the level of the direct-current voltage and a level of the voltage across the output-side capacitor.

13. A switched-capacitor-type stabilized power supply device as claimed in claim 10, wherein the switching control circuit controls the switching circuit so that the input terminal is not connected to any of the voltage step-up circuits of which the voltage step-up factor is equal to or higher than a predetermined value divided by the direct-current voltage.

14. A switched-capacitor-type stabilized power supply device as claimed in claim 10, further comprising:

a circuit for turning off those of the voltage step-up circuits and the voltage step-down circuit which are not connected to the input terminal by the switching circuit.

15. A switched-capacitor-type stabilized power supply device as claimed in claim 10, further comprising:

a circuit for turning off portions of the control circuit that control those of the voltage step-up circuits and the voltage step-down circuit which are not connected to the input terminal by the switching circuit.

16. A switched-capacitor-type stabilized power supply device as claimed in claim 11, further comprising:

a circuit for turning off those of the voltage step-up circuits and the voltage step-down circuit which are not connected to the input terminal by the switching circuit; and a circuit for turning off portions of the control circuit that control those of the voltage step-up circuits and the voltage step-down circuit which are not connected to the input terminal by the switching circuit.

17. A switched-capacitor-type stabilized power supply device as claimed in claim 12, further comprising:

a circuit for turning off those of the voltage step-up circuits and the voltage step-down circuit which are not connected to the input terminal by the switching circuit; and a circuit for turning off portions of the control circuit that control those of the voltage step-up circuits and the voltage step-down circuit which are not connected to the input terminal by the switching circuit.

18. A switched-capacitor-type stabilized power supply device as claimed in claim 13, further comprising:

a circuit for turning off those of the voltage step-up circuits and the voltage step-down circuit which are not connected to the input terminal by the switching circuit; and a circuit for turning off portions of the control circuit that control those of the voltage step-up circuits and the voltage step-down circuit which are not connected to the input terminal by the switching circuit.

* * * * *